United States Patent [19]

Tennant

[11] Patent Number: 5,023,529

[45] Date of Patent: Jun. 11, 1991

[54] CONTROL CIRCUIT

[75] Inventor: James A. Tennant, Perrysville, Ohio

[73] Assignee: Therm-O-Disc, Incorporated, Mansfield, Ohio

[21] Appl. No.: 475,293

[22] Filed: Feb. 5, 1990

Related U.S. Application Data

[63] Continuation-in-part of Ser. No. 228,439, Aug. 5, 1988, Pat. No. 4,983,897.

[51] Int. Cl.[5] .............................................. H02P 1/22
[52] U.S. Cl. ................................... 318/266; 318/285; 318/286; 318/466
[58] Field of Search .............................. 318/560–640, 318/430–434, 260–293, 466, 445; 361/20–24; 307/117, 10.1

[56] References Cited

U.S. PATENT DOCUMENTS

| 4,328,451 | 5/1982 | Barge | 318/265 X |
|---|---|---|---|
| 4,347,465 | 8/1982 | Goertler et al. | 318/266 |
| 4,351,016 | 9/1982 | Felbinger | 318/286 X |
| 4,373,149 | 2/1983 | Coste | 318/281 |
| 4,562,387 | 12/1985 | Lehnhoff | 318/285 |
| 4,678,975 | 7/1987 | Vrabel et al. | 318/266 |
| 4,686,598 | 8/1987 | Herr | 318/286 X |
| 4,709,196 | 11/1987 | Mizuta | 318/282 |
| 4,710,685 | 12/1987 | Lehnhoff et al. | 318/434 X |
| 4,725,765 | 2/1988 | Miller | 318/434 |
| 4,746,845 | 5/1988 | Mizuta et al. | 318/266 X |
| 4,796,011 | 1/1989 | Lemirando et al. | 318/266 X |
| 4,801,812 | 1/1989 | Brusasco | 318/466 X |
| 4,808,894 | 2/1989 | Mizuta | 318/266 |
| 4,870,333 | 9/1989 | Itoh et al. | 318/286 |
| 4,900,994 | 2/1990 | Mizuta | 318/266 X |

Primary Examiner—Paul Ip
Attorney, Agent, or Firm—Jones, Day, Reavis & Pogue

[57] ABSTRACT

A control circuit for connecting a load to a voltage source includes an electronic holding circuit having latched and unlatched states. When latched, the electronic holding circuit connects the load to the voltage source. A thermal device responsive to excessive current demand by the load automatically places the holding circuit in its unlatched state, and disconnects the load from the voltage source. The circuit may also be placed in its unlatched state by sensing a current in a resistor to unlatch the circuit without requiring a current sufficient to cause the thermal device to respond.

8 Claims, 5 Drawing Sheets

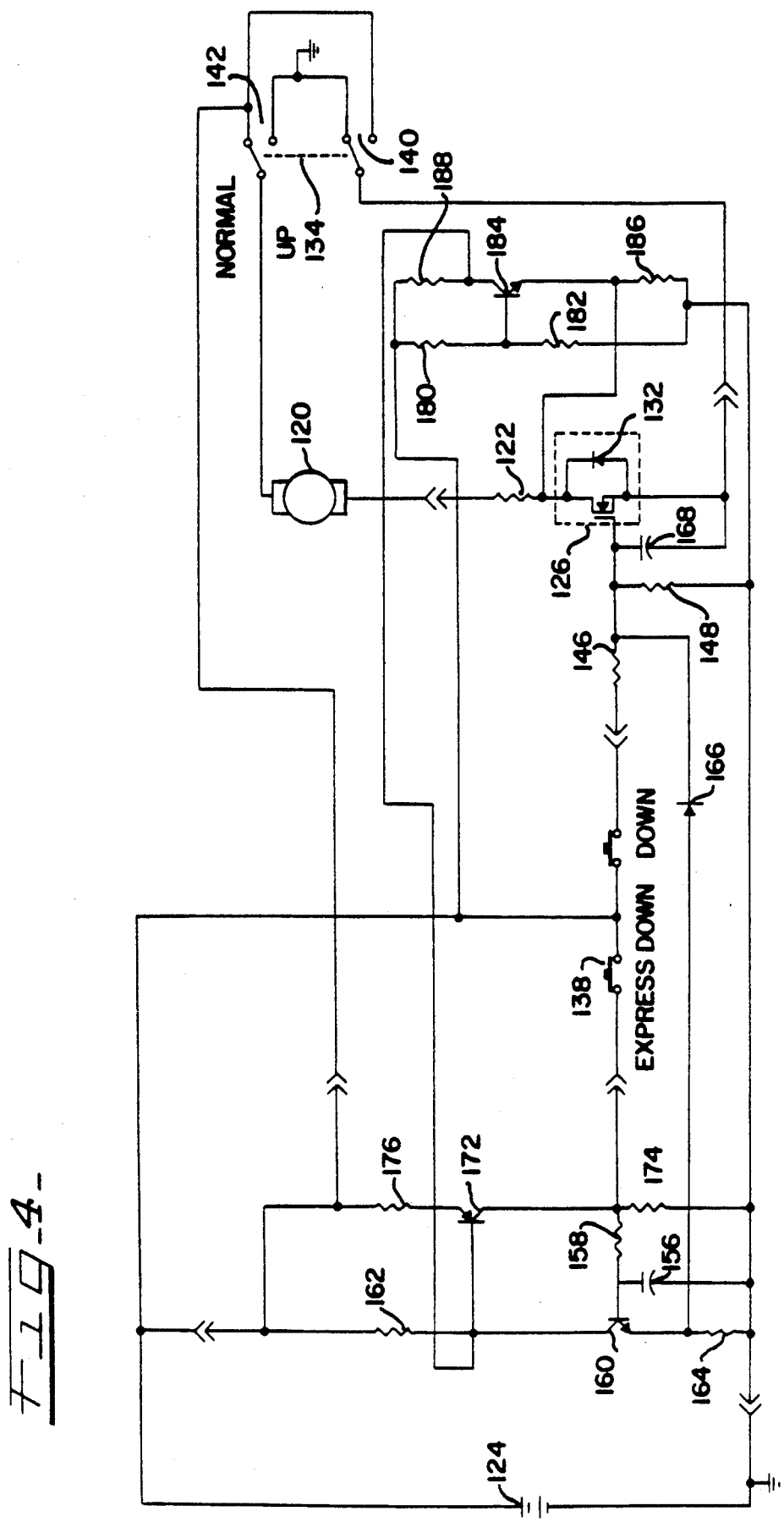

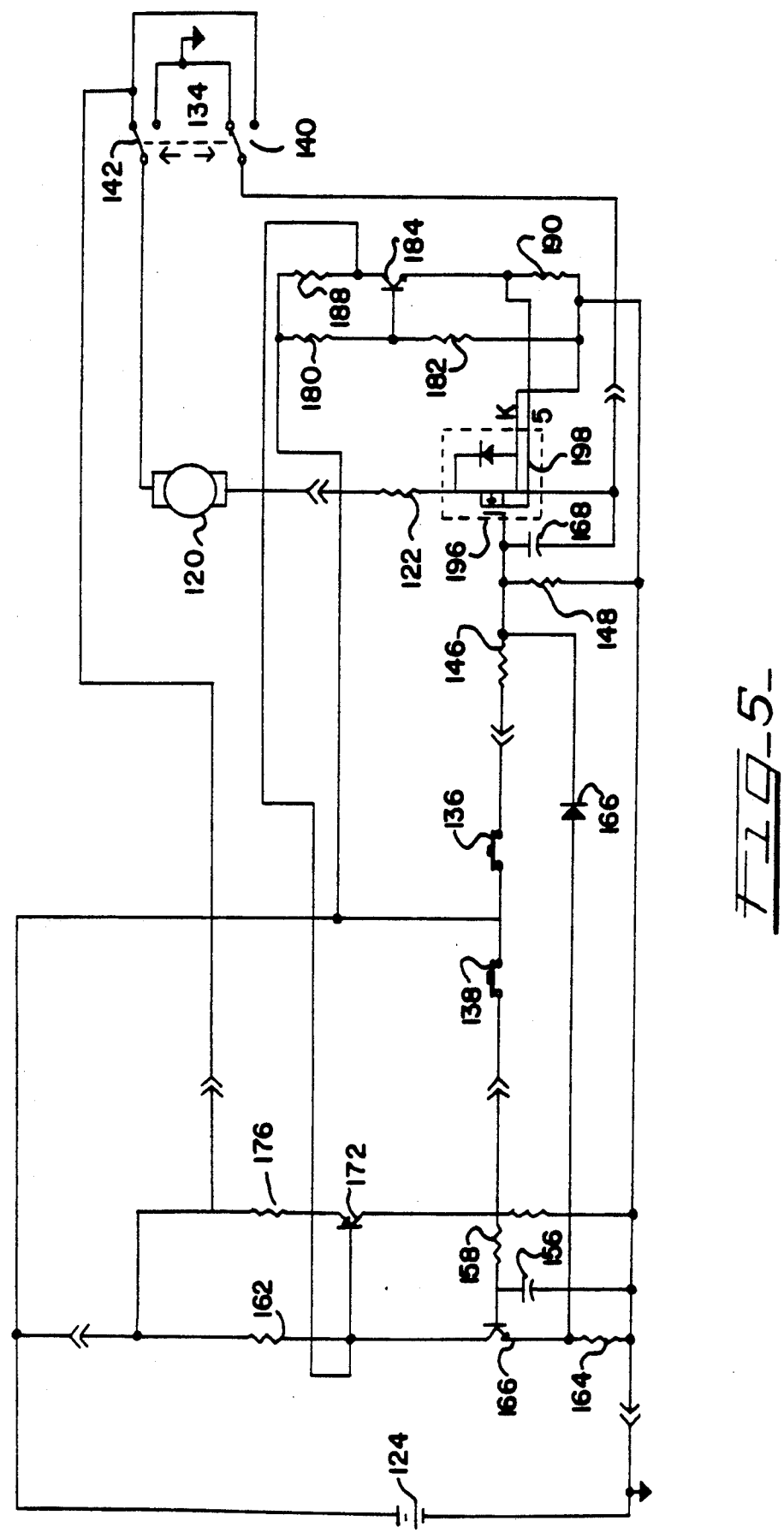

CONTROL CIRCUIT

This is a continuation-in-part application of application Ser. No. 228,439 filed Aug. 5, 1988, now U.S. Pat. No. 4,983,897.

BACKGROUND OF THE INVENTION

This invention relates to the art of control circuits and, more particularly, to control circuits for automatically disconnecting a load from a voltage source when a predetermined condition is sensed. The invention is particularly applicable to use with electric motors and will be described with specific reference to electric motors. However, it will be appreciated that the invention has broader aspects and can be used with other electrically operated devices.

It is common to provide automobiles with motor-operated devices such as power windows, power antennas, power seats and power sun roofs. Control circuits for such motors commonly use mechanical current relays that are sensitive to vibration and voltage variations and do not provide overload protection. In such a case, a separate device must be provided for overload protection.

It would be desirable to provide a reliable control circuit having decreased sensitivity to vibration and voltage variations, while also providing overload protection.

SUMMARY OF THE INVENTION

In accordance with the present application, a PTC device performs the dual functions of providing overload protection and de-energizing a holding circuit. In the alternative, the PTC device may be used only to provide ultimate overload protection, and the dual functions of overload protection and de-energizing the holding circuit may be performed by an electronic circuit.

The control circuit of the present invention includes a holding circuit having latched and unlatched states for respectively connecting and disconnecting a voltage source and load. Manually operable means is provided for energizing the holding circuit to connect the voltage source and load through the holding circuit independently of the manually operable means. Thermal means responsive to excessive current flow to the load is provided for unlatching the holding circuit to disconnect the voltage source from the load. The thermal means is also disconnected from the voltage source when the holding circuit is unlatched.

The improved circuit of the present invention includes switch means for selectively reversing the direction of current flow to the load. The holding circuit is operative for supplying current to the load in one direction only.

The circuit preferable includes switch means for selectively connecting the voltage source and the load independently of the holding circuit and the manually operable means. This makes it possible to supply current to the load while bypassing the holding circuit.

In a preferred arrangement, the control circuit is used to control a motor that is used to move a movable member having a limited degree of travel in opposite directions between limit positions. The thermal means is operative in response to an overload on the motor that occurs when the movable member reaches one of its limit positions or when the movable member encounters an obstacle between its limit positions. The limit position may also be sensed as an increase in voltage across a resistor caused by an increase in current resulting when the movable member reaches its limit. In this case, the thermal means is actuated only in case of an unplanned overload.

It is a principal object of the present invention to provide an improved control circuit for controlling a holding circuit that connects a voltage source to a load while also providing overload protection.

It is another object of the invention to provide such a control circuit that is inexpensive to manufacture and assemble, and that is reliable in operation.

Other objects will become apparent in the course of a detailed description of the invention.

BRIEF DESCRIPTION OF THE DRAWINGS

FIG. 4 shows an alternate embodiment of the control circuit for the practice of the present invention.

FIG. 5 shows a second alternate embodiment of the control circuit for the practice of the present invention.

DETAILED DESCRIPTION OF THE INVENTION

The Figures show control circuits for operating automobile power windows. Each of the control circuits includes an automatic or express switch that can be operated momentarily to energize a holding circuit that operates the motor until a window reaches its lower position. The circuits also include normal down and normal up switches for selectively operating the motor to move the window up or down. Thermal means responsive to increased current demand by the motor unlatches the holding circuit and also provides overload protection. The unlatching operation may also be performed as a part of the operation of the circuit.

Figure 1:
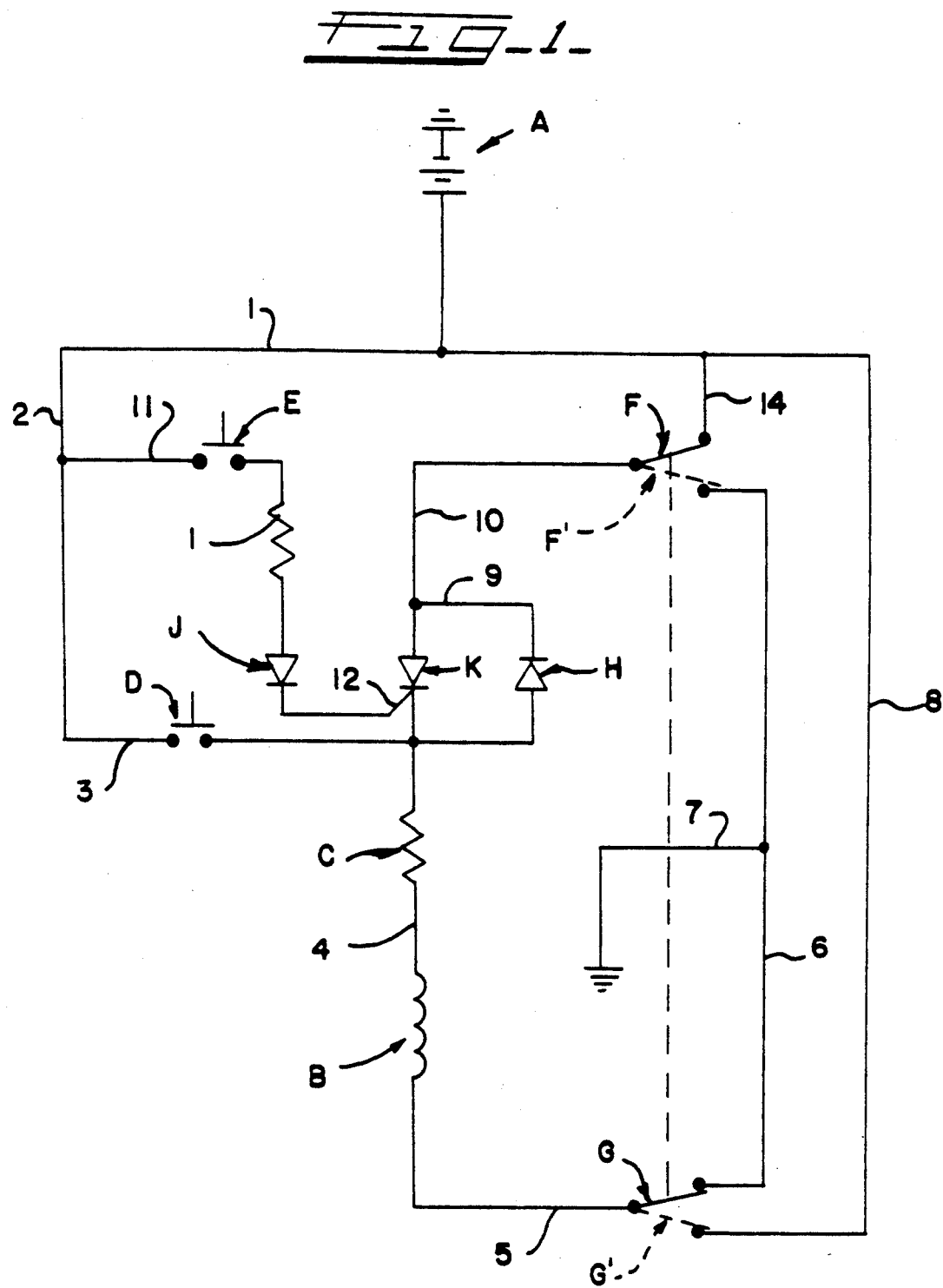
FIG. 1 shows one embodiment of a control circuit in accordance with the present invention.

In FIG. 1, voltage source A provides electric power to operate motor B. Thermal means C is connected in series with motor B and responds to a current overload in motor B to disconnect motor B from voltage source A. Although thermal means C can take many forms, it is preferably of the type having a positive temperature coefficient of resistance. The material used for thermal means C can be a conductive polymer having a particulate conductive filler, such as carbon black. However, the material can also take other forms, including a doped ceramic such as barium titanate. A thermal protector of the type described will be referred to here as a PTC device or a PTC material. A PTC device exhibits a non-linear change in resistance with temperature. Within a certain narrow temperature range, the electrical resistance of a PTC device increases sharply with a relatively slight increase in temperature. A PTC device may be customized to respond either to temperature conditions of the surrounding environment or to current overload conditions. Also, the resistance and switching temperature of a PTC device can be varied by changing the composition of the PTC material, by changing its geometry, or both.

In a typical application, a PTC device is connected in series with the circuit components requiring protection. In the event of an overload in the system, the PTC device will reach its switching temperature either by self-induced heating ($I^2R$) from the current passing through it or by sensing excessive ambient temperatures. At this point, the PTC device switches into its high-resistance state, and effectively blocks the flow of current. A minimal amount of current will persist (trickle current), which holds the PTC device in its high-resistance state. Once the power source has been interrupted and the abnormal condition has been corrected, the PTC device will return to its low-resistance state, ready to protect the system once again.

Normal down switch D is operable to cause motor B to move a window down to any desired open position. The window stops when the switch D is released. Automatic or express down switch E operates motor B automatically to move a window completely down to its full open position. Ganged switches F and G are normally biased to the positions shown by solid lines, and can be set to the positions shown by dotted lines to operate motor B to move the window up.

When normal down switch D is closed, current is supplied from voltage source A through lines 1, 2 and 3 to thermal means C and motor B in line 4. The circuit is completed through line 5, switch G, line 6 and line 7. Release of switch D disconnects motor B from voltage source A and stops the window wherever it is when the switch D is released.

When it is desired to raise the window, ganged switches F and G are moved to the positions shown by primed letters. Current is then supplied from voltage source A through line 8, switch G and line 5 to motor B and thermal means C in line 4. Current flow through motor B is reversed to operate motor B in a reverse direction to move the window up. From line 4, current flows through diode H in line 9 to line 10, switch F, and then through line 6 to line 7.

When the circuit of FIG. 1 is operated in the automatic or express down mode, switches F and G are in the normal positions shown by solid lines. Closing switch E provides current from voltage source A through lines 1, 2 and 11, and through a current-limiting resistor I and a diode J to gate 12 of an SCR K. This gates the SCR K on so that current flows through it from voltage source A through line 1, line 14, switch F and line 10. Switch E can be released as soon as SCR K is gated on because the current flowing through SCR K will keep it conducting. When the window reaches its full down position, motor B will stall and cause a significantly greater current flow. This will cause thermal means C to switch to its high-resistance state, reducing the current flow to motor B to a trickle. At the same time that thermal means C switches to its high-resistance state, the trickle current through SCR K will no longer be sufficient to keep SCR K conducting. Therefore, SCR K will drop out of conduction, and the circuit will be deactivated until one of the switches is again operated.

Figure 2:
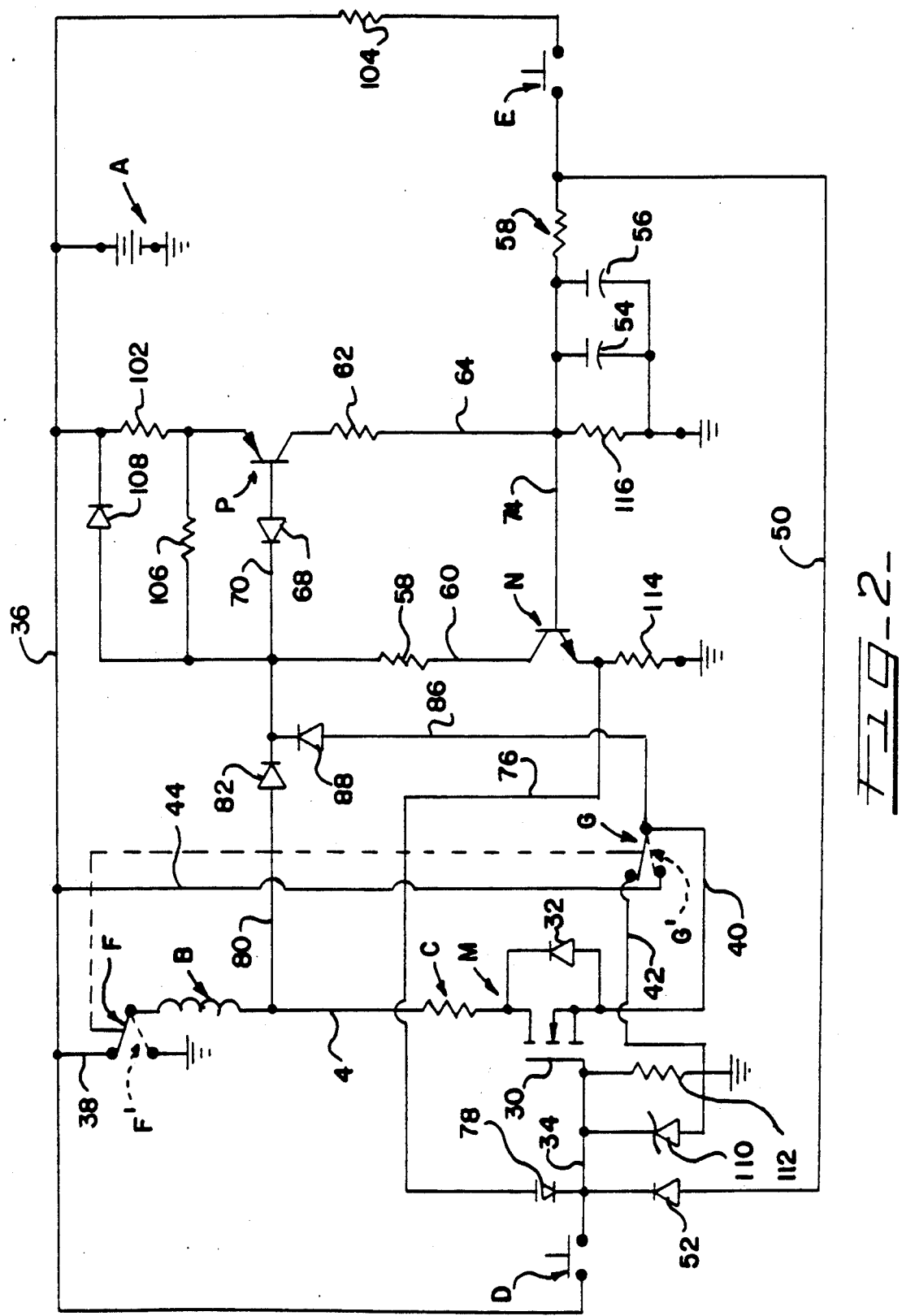
FIG. 2 shows another embodiment of a control circuit in accordance with the present invention.

FIG. 2 shows a circuit that includes a MOSFET M connected in series with motor B and thermal means C. MOSFET M has a gate 30, and a diode 32 is internal to the MOSFET M. Closing normal down switch D provides a biasing voltage through line 34 to the gate 30 of MOSFET M to turn the MOSFET M on. Current then flows from voltage source A through lines 36, 38 and switch F to motor B and thermal means C in line 4. Current flows through MOSFET M to line 40, switch G and line 42. Releasing normal down switch D will stop the motor because the absence of a biasing voltage on MOSFET gate 30 will turn the MOSFET M off.

To operate the motor B in the reverse direction and move the window up, switches F and G are moved from their normal solid line positions to the dotted line positions F' and G'. Current is then supplied from voltage source A through line 36, line 44, switch G', line 40, internal MOSFET diode 32, line 4 and switch F'. Releasing switches F and G will allow them to return to their solid line positions and will stop the motor B with the window in any desired position. If the window encounters an obstruction or reaches its full up or down position while switches D or F and G remain depressed, the motor will demand a higher current which will be sensed by thermal means C to interrupt current flow to the motor B.

The motor B can be operated to move the window to its full down position by momentarily closing automatic or express down switch E. Closing of switch E provides a biasing voltage on the MOSFET gate 30 through line 50, diode 52 and line 34 to turn the MOSFET M on. Momentary closing of switch E also charges capacitors 54 and 56 through a resistor 58. When capacitors 54 and 56 are charged to a predetermined voltage, an NPN transistor N will be biased on. This in turn will provide a forward bias on a PNP transistor P to turn it on. A resistor 58 in a line 60 provides a proper voltage drop to the emitter of a transistor P so that when the transistor N is turned on a forward bias will be provided for transistor P. Resistor 62 in line 64 is a current-limiting resistor.

Transistors N and P are part of a holding circuit and diode 68 in line 70 isolates this holding circuit from the motor circuit. Once transistors N and P are turned on and switch E is opened, current flowing through transistor P and line 64 will keep transistor N in conduction through line 74. Current flows from transistor N through line 76 and diode 78 to line 34 to maintain a biasing voltage on MOSFET gate 30. Current then flows through motor B, thermal means C and MOSFET M in the same manner as was explained for the closing of the normal down switch D.

With express down switch E released and transistors N and P conducting, the motor B will operate until the window is completely down. At that point, the motor will demand increased current which will cause thermal means C to switch to its high-resistance state. This will provide a reverse bias through line 80, diode 82 and line 70 to turn off transistor P. This also turns off transistor N and removes the biasing signal from MOSFET gate 30. The entire circuit will then remain off until one of the switches is again operated.

If up switches F' and G' are operated while the circuit is in the express down mode, a reverse bias on transistor P will be provided through line 44, switch G', line 86, diode 88 and line 70 to cut off transistor P. This will unlatch the holding circuit.

Resistors 102 and 104 are current-limiting resistors. Resistor 106 is a degenerative feedback resistor to transistor P that reduces the sensitivity of the holding circuit to noise. Diode 108 is a dynamic braking diode that is connected across the motor B only in the up mode. Diode 108 applies a short circuit across the motor B when the up switches F' and G' are released to return to their normal positions F and G while the window is moving up. This provides dynamic braking for the motor B. A zener diode 110 and a resistor 112 near MOSFET gate 30 absorb transient currents and voltages to protect the MOSFET gate 30 against spikes. Resistors 114 and 116 provide a desired voltage drop. When transistor P is turned off, capacitors 54 and 56 discharge and turn transistor N off.

In the arrangements shown and described, SCR K of FIG. 1 and transistors N and P of FIG. 2 are part of electronic means having energized and de-energized states for respectively connecting and disconnecting the voltage source and the load defined by the motor. These electronic means also include a holding circuit having latched and unlatched states to connect and disconnect the motor from the voltage source. Express down switch E defines manually operable means for energizing the electronic means or holding circuit to connect the voltage source and motor through the electronic means or holding circuit independently of switch E. Thermal means C is responsive to excessive current flow to the load defined by motor B to de-energize or unlatch the electronic means or holding circuit and disconnect the motor from the voltage source. Thermal means C is also disconnected from the voltage source when the electronic means or holding circuit is de-energized. Switches F and G define switch means for selectively reversing the direction of current flow to the load defined by motor B. The electronic means or holding circuit provides current to the motor B in only one direction. Normal down switch D defines switch means for selectively connecting the voltage source and load independently of manually operable means E and electronic means K of FIG. 1, or transistors N and P of FIG. 2.

Figure 3:
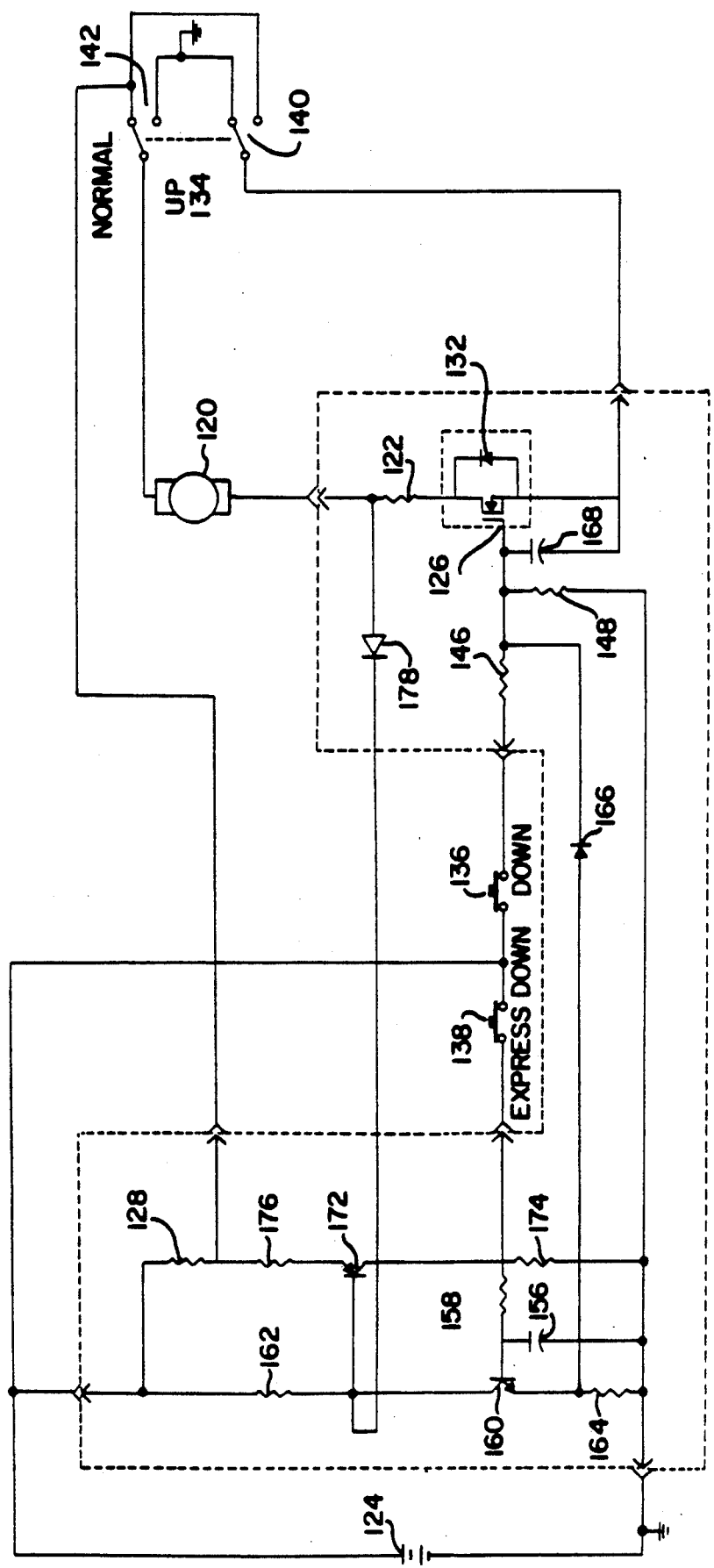
FIG. 3 shows a preferred embodiment of a control circuit for the practice of the present invention.

FIG. 3 is a circuit diagram of a preferred embodiment for the practice of the present invention. In FIG. 3, a motor 120 is connected in series with a thermal means 122 that is typically a PTC device as described above. A voltage source 124, typically the battery of an automobile, supplies energy to drive the motor 120 and also to operate the thermal means 122 in case of an overcurrent. An FET 126 is also placed in series with the motor 120 and the thermal means 122 to control the current through both. However, the circuit of FIG. 3 contains one feature that is not common to the circuits of FIGS. 1 and 2. This is a resistor 128 that carries the current through the motor 120 and the thermal means 122 and the FET 126 in all modes of operation of the circuit. The resistor 128 is typically a wirewound resistor of nichrome or the like to carry the relatively heavy currents associated with operation of a power window or the like. It will be seem that the voltage drop across the resistor 128 is the primary means of reducing the current through the motor 120 when the load driven by the motor 120 is obstructed or reaches the end of a desired period of travel. This will become apparent in the following description.

This description will be given in terms of the operation of the circuit of FIG. 3 as a controller for electrically-operated automobile windows, although its application is equally adaptable to the uses described earlier, i.e., power antennas, sun roofs, and the like. Characteristic of these uses is the desire to have the motor operate in one direction only in response to a switch that is held, while in the other direction it may operate in that mode or in an express mode that continues to completion when a switch is pressed and either held or released. In the case of a power window, this typically calls for operating the window up only in response to the manual switch, and providing alternative modes of operating the window down that either operates while the switch is held (normal down) or that lowers the window completely when the switch is operated momentarily (express down). Any of these modes is terminated normally when the window reaches the end of its travel in the appropriate direction, and any of these modes may be interrupted at any time if the window encounters an overload.

Referring to FIG. 3, a double-pole-double-throw (DPDT) switch 134 is shown in a normal position. When the DPDT switch 134 is operated so as to reverse the connection shown, this operates the motor 120 so as to drive a power window up. A normally-open switch 136 is a normal down switch and a normally-open switch 138 is an express down switch. Each of these will remain open unless operated manually. Thus, when the DPDT switch 134 is operated so as to cause the window to go up, current flow is from the upper terminal of the voltage source 124, through the resistor 128, the contacts 140 of the switch 134, up through the diode 132, the thermal means 122, the motor 120 and through the contacts 142 to ground. This operation continues as long as the DPDT switch 134 is operated or as long as current through the thermal means 122 is less than the amount that will cause it to switch to a high-resistance mode. If this happens, current through the thermal means 122 is reduced to a trickle, normally enough to keep it in the high-resistance mode, but enough to reduce the torque produced by the motor 120 essentially to zero.

To operate the window down, the DPDT switch 134 is allowed to remain in the normal position. Suppose first that the window is to be operated in the normal down mode. The normally-open switch 136 is closed, applying the voltage of the voltage source 124 to a voltage divider consisting of the resistor 146 and a resistor 148. This enables current flow from the voltage source 124 through resistor 128, through the contacts 142 of the DPDT switch 134, down through the motor 120, the thermal means 122, the FET 122, and through the contacts 140 to the ground. This operation will continue as long as the normally open switch 136 is held and as long as the thermal means 122, typically a PTC device, is in its normal mode. If the load operated by the motor 120 is obstructed, either by an object in the window or the like, or by reaching the end of travel while the switch 136 continues to be held, the thermal means 122 will switch to its high-resistance state. As before, this will reduce the current through the motor 120 and thermal means 122 to a trickle, enough to keep the thermal means 122 in its high-resistance state, but not enough to apply substantial torque from the motor 120.

The circuit of FIG. 3 is operated in the express-down mode by operating the normally-open switch 138. An intermittent contact is all that is necessary to start and continue the operation. When the switch 138 is depressed, a capacitor 156 is charged through a resistor 158. This biases a transistor 160 on, allowing conduction through a resistor 162 and an emitter resistor 164. The voltage across the emitter resistor 164 is coupled through a diode 166 to the gate of the FET 126 to allow it to conduct. Capacitor 168 is connected from the drain of the FET 126 to its gate to protect the FET 126 against voltage spikes.

The capacitor 156 is designed to hold its charge during a typical cycle of express-down operation of the window, holding the transistor 160 on and supplying a voltage to the gate of the FET 126. The base of the transistor 172 is connected to the collector of the transistor 160. The collector of the transistor 172 is connected to a junction of the resistor 158 and a resistor 174, and the emitter of the transistor 172 is connected through the resistor 128. During normal express-down operation, after the switch 138 has been released, the transistor 172 will be essentially nonconducting.

If the current increases in the motor 120, this also represents an increase in the current in the resistor 128. This will reduce the voltage on the emitter of the transistor 172, causing it to conduct and turning off the transistor 160. This in turn will gate off the FET 126, interrupting flow of current to the motor 120. When the transistor 172 conducts, this will effectively discharge the capacitor 156, releasing a latch so that the motor will stay off. This mode of operation occurs when the motor 120 has stopped because it has driven the window or the like to the end of its normal travel.

The circuit of FIG. 3 is up-dominant, meaning that if several switches are held at the same time the window will go up. A diode 178 may be connected as shown to ensure that the latch is released if two or more switches are operated at once.

FIG. 4 is a circuit diagram of an alternate circuit for the practice of the present invention. In FIG. 4, the motor 120 is driven in the up mode and the normal down mode exactly as it was in FIG. 3, so this mode of operation will not be described further with respect to FIG. 4. Charging of the capacitor 156 to latch the express down mode and switch on the FET 126 also operates as in the circuit of FIG. 3. FIG. 4 differs from FIG. 3 in that resistor 128 is not present in FIG. 4. Instead, the contacts 142 are connected directly to one side of the voltage source 124. A resistor 180 is connected in series with a resistor 182 to form a voltage divider that applies a fixed voltage to the base of a transistor 184. The emitter of the transistor 184 is connected to ground through a resistor 186 and also to the source of the FET 126. The collector of the transistor 184 is connected to one side of the voltage source 124 through a resistor 188 and is also connected to the base of the transistor 172. The transistor 184 is normally biased off. When the motor 120 encounters an increased load, the emitter voltage is increased, switching the transistor 184 on and coupling the current to the transistor 172 that switches it on. This discharges the capacitor 156 as in the operation of the circuit of FIG. 3, releasing the latch. A diode 178 may be used in the circuit with the same function as in FIG. 3.

FIG. 5 is a circuit diagram of an alternate embodiment for the practice of the present invention. In FIG. 5, the components common to FIG. 4 are numbered so as to correspond. The principal difference in FIG. 5 is that FET 196 has an extra terminal 198 that is connected internally to the substrate of the FET 196. The voltage applied to the resistor 190 of FIG. 5 is taken from the terminal 198 rather than being taken across the entire FET 126 as in FIG. 3. Otherwise, the circuit of FIG. 5 operates like that of FIG. 4.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

I claim:

1. A control circuit for connecting a load driving motor to a voltage source comprising:
   first and second manually operated switches coupled to the voltage source and the motor for causing the motor to selectively drive the load in first and second directions:
   an electronic switch in series with the motor and the voltage source and having a conducting and a non-conducting state;
   a time constant latching circuit coupled to the electronic switch for placing the electronic switch in a conducting state to enable the motor to continuously drive the load in the first direction when the time constant latching circuit is energized; and
   a third manually operated switch that is operable momentarily for energizing the time constant latching circuit.

2. A control circuit as in claim 1 further comprising latching circuit releasing means coupled to the motor and the time constant latching circuit for releasing the time constant latching circuit from an energized state to place the electronic switch in a non-conducting state when the motor is overloaded.

3. A control circuit for connecting a load driving motor to a voltage source comprising:
   first and second manually operated switches coupled to the voltage source and the motor for causing the motor to selectively drive the load in first and second directions:
   an electronic switch in series with the motor and the voltage source and having a conducting and a non-conducting state;
   a time constant latching circuit coupled to the electronic switch for causing the electronic switch to enable the motor to continuously drive the load in the first direction when the time constant latching circuit is energized;
   a third manually operated switch that is operable momentarily for energizing the time constant latching circuit; and
   latching circuit releasing means coupled to the motor and the time constant latching circuit for releasing the time constant latching circuit from an energized state when the motor is overloaded, said latching circuit releasing means including:
   a transistor coupled to the time constant latching circuit for discharging the time constant latching circuit when the transistor is in a conducting state;
   a first resistor coupled in series with the voltage source and the motor; and
   a second resistor coupled at one end to the junction of the first resistor and the motor and coupled at the other end to the transistor such that an increase of current through the motor caused by an overload creates a voltage drop across the first resistor that causes the transistor to conduct and release the time constant latching circuit.

4. A control circuit for connecting a load driving motor to a voltage source comprising:
   first and second manually operated switches coupled to the voltage source and the motor for causing the motor to selectively drive the load in first and second directions:
   an electronic switch in series with the motor and the voltage source and having a conducting and a non-conducting state;

a time constant latching circuit coupled to the electronic switch for causing the electronic switch to enable the motor to continuously drive the load in the first direction when the time constant latching circuit is energized; and a third manually operated switch that is operable momentarily for energizing the time constant latching circuit; and latching circuit releasing means coupled to the motor and the latching circuit for releasing the latching circuit from an energized state when the motor is overloaded, said latching circuit releasing means including:

a first transistor coupled to the latching circuit for discharging the time constant latching circuit when the first transistor is in a conducting state;

a second transistor coupled to the motor such that the conducting state of the second transistor is changed by an overload condition on the motor; and means coupling the second transistor to the first transistor to cause the first transistor to conduct and release the time constant latching circuit when the motor is in the overloaded condition.

5. A control circuit as in claim 4 further comprising:

means causing the second transistor to be normally non-conducting; and means coupling the second transistor emitter to the motor such that an increase of current through the motor due to an overload condition causes the second transistor to change a state from non-conducting to conducting to release the time constant latching circuit.

6. A control circuit as in claim 5 further comprising:

a resistor in the collector circuit of the second transistor; and means connecting the junction of the resistor and the collector of the second transistor to the base of the first transistor such that the conduction of the second transistor on motor overload causes a voltage drop across the resistor which, when applied to the base of the first transistor, causes the first transistor to conduct and release the time constant latching circuit.

7. A control circuit as in claim 5 wherein the emitter of the second transistor is coupled to the junction of the electronic switch and the motor such that an increase of current through the motor due to an overload condition causes the second transistor to conduct.

8. A control circuit as in claim 5 wherein:

the electronic switch is a MOSFET having a substrate; and the emitter of the second transistor is coupled to the substrate of the MOSFET such that an increase of current through the MOSFET because of an overload condition on the motor causes the second transistor conduct.

* * * * *